No. 892,500.  
PATENTED JULY 7, 1908.  
R. N. CHAMBERLAIN.  
BATTERY INDICATOR.  
APPLICATION FILED NOV. 11, 1903.
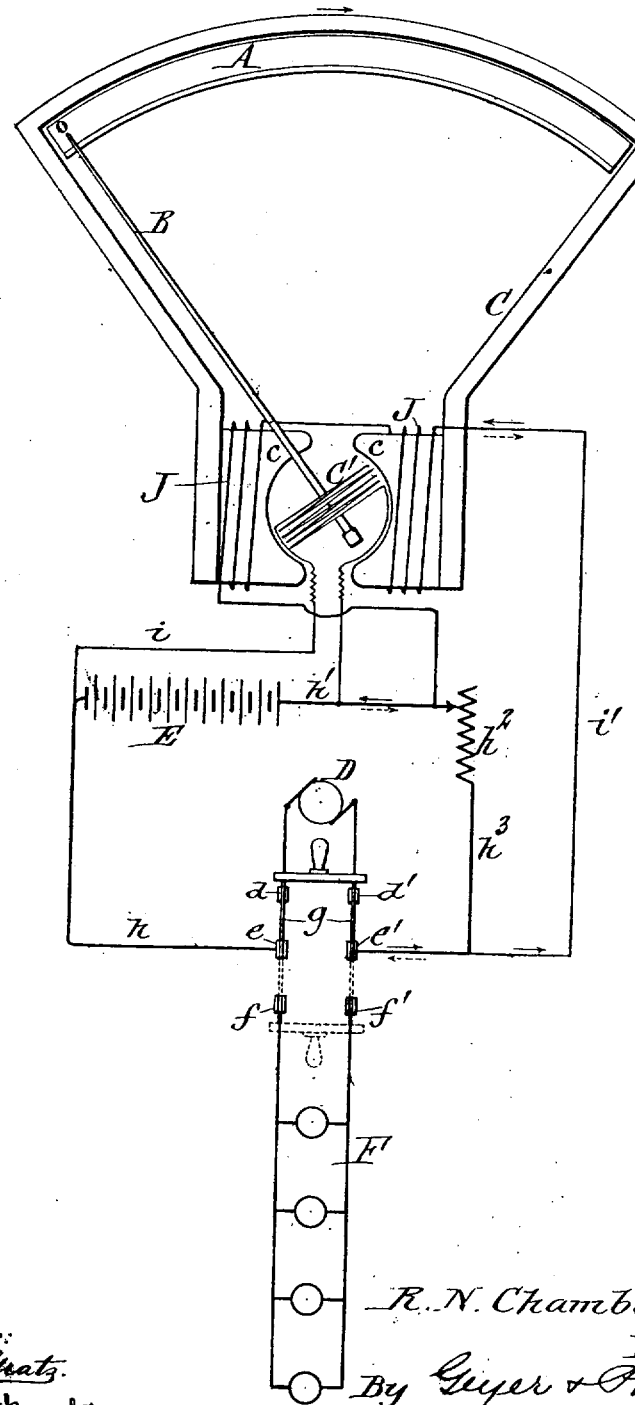
Witnesses:  
Louis W. Gratz.  
Robert Whitknecht.
R. N. Chamberlain,  
Inventor  
By Geyer & Popp  
Attorneys

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y., A CORPORATION OF NEW YORK.

BATTERY-INDICATOR.

No. 892,500.

Specification of Letters Patent.

Patented July 7, 1908.

Application filed November 11, 1903. Serial No. 180,672.

*To all whom it may concern:*

Be it known that I, RUFUS N. CHAMBERLAIN, a citizen of the United States, residing at Depew, in the county of Erie and State of New York, have invented new and useful Improvements in Battery-Indicators, of which the following is a specification.

This invention relates to an instrument for indicating the condition of a storage battery, both in charging and discharging.

It is well known to those skilled in the art that the higher the rate at which a battery is charged, the greater will be its back pressure. It is also a fact that when at a normal charging rate the back pressure reaches a certain point, the battery can be said to be fully charged, although when the battery is charged at a higher rate the voltmeter indicates the same point or pressure notwithstanding that the battery is not fully charged. Skilled electricians having knowledge of these facts, make the necessary allowances in charging at different rates, but ordinary, uneducated attendants are liable to regard a battery as fully charged before it really is, simply from the above mentioned fact as to the indications at a normal charging rate.

The object of my invention is to provide an indicator of this character which requires no calculations or allowances to be made in reading the same, but indicates with certainty, especially to uneducated attendants, when a battery is properly and fully charged, regardless of varying charging rates within the ordinary limits of practice, and also to what extent the battery has been discharged in service, irrespective of varying charging rates within such limits.

The accompanying drawing is a diagrammatic view of my improved indicator in connection with a battery, a generator and a series of electric lamps.

In its preferred form, the indicator is constructed upon the general lines of the well known voltmeters employing a permanent magnet and an index or pointer carried by a coil which oscillates between the pole pieces of the magnet.

Referring to the drawing, which illustrates diagrammatically the preferred construction of the indicator, A is the segmental scale of the instrument and B the pointer traversing the same.

C indicates the body of the permanent magnet; $c$ its pole pieces and $C^1$ the oscillating coil arranged between the pole pieces and carrying the pointer.

D is a dynamo or generator, E a storage battery and F a series of electric lamps or any other desired translating device, such as the motor of an electric automobile, a suitable switch being employed for connecting the battery either with the dynamo or the translating devices. In the arrangement shown in the drawing, the poles of the dynamo are connected with the upper pair of switch contacts $d, d^1$, the terminals of the translating circuit with the lower pair of contacts $f, f^1$, and the poles of the battery with the intermediate pair of contacts $e, e^1$, to which latter a reversible switch lever $g$ of any ordinary construction is pivoted.

$h$ is a wire connecting one side of the battery with the switch contact $e$; $h^1$ a wire connecting the other side of the battery with a variable shunt $h^2$, and $h^3$ a wire extending from the variable shunt to the switch contact $e^1$. The ends of the oscillating coil $C^1$ are connected with the wires $h$ and $h^3$ by wires $i$, $i^1$, respectively, so that the same bridges the battery.

J indicates an auxiliary or modifying coil wound around the pole pieces $c$ and adapted to partly counteract or diminish the effect of the permanent magnet or main field flux in charging a battery and to augment its effect in discharging the battery. One end of this auxiliary coil is connected with the wire $i^1$ while its other end is connected with the wire $h^1$, whereby the variable shunt $h^2$ extends across said coil. This coil is properly wound to produce the above-mentioned modifying effects.

In charging the battery, the switch lever $g$ is turned to the position shown by full lines in the drawing for connecting the battery with the dynamo. The current now passes from one pole of the dynamo through the wire $h^3$, variable shunt $h^2$, wire $h^1$, the battery and wire $h$ to the other pole of the dynamo, as indicated by the arrows shown in full lines. A portion of the current also passes through the pointer-actuating coil $C^1$ and the modifying coil J. Both coils are thus energized and the oscillating coil with the pointer is deflected more or less according to the strength of the current, as in the standard voltmeters of the type shown, while the auxiliary coil J partly neutralizes or counteracts the effect of the permanent magnet C and diminishes its power accordingly. The result is that the auxiliary coil compensates for the tendency of the pointer of the ordinary voltmeter to indicate a higher condition of charge than actually exists when a battery is charged at a rate more or less above the normal. The pointer therefore indicates the actual condition of the battery as the same gradually becomes charged, thus requiring no calculations or allowances to be made by the observer or attendant.

It will be understood from the foregoing that the higher the charging current the more the auxiliary coil J becomes energized, and vice versa, and the indicating point at which the battery is fully charged thus remains practically stationary under varying charging rates.

When the switch lever $g$ is reversed to the position shown by dotted lines in the drawing for connecting the charged battery with the lamp circuit or other translating device, the current which now flows from the battery in the reverse direction, passes through the wire $h^1$, variable shunt $h^2$ and wire $h^3$ in the direction indicated by the broken arrows in the drawing. The direction of the current through the auxiliary coil J is also reversed, and under these conditions this coil increases the power of the permanent magnet or main field flux and retards the backward oscillation of the movable coil $C^1$ due to the discharge of the battery.

In the use of the ordinary voltmeter, when considerable current is temporarily drawn from the battery, as in climbing a hill with an electric automobile, the pointer has a tendency to indicate a lower condition of discharge than actually exists just as it tends to indicate a higher condition of charge than really exists under a charging rate above the normal. When this occurs, the uneducated observer or attendant is liable to conclude that more than the real amount of discharge has taken place. In my improved instrument, under the above discharging conditions the auxiliary coil J by augmenting the power of the permanent magnet counteracts or compensates for the tendency of the pointer to indicate a lower condition of discharge than really exists, and the instrument therefore indicates the actual condition of the battery, without requiring any calculation or allowance to be made by the observer.

The variable shunt $h^2$ is not indispensable, but I prefer to employ the same to permit the power or modifying effect of the auxiliary coil to be increased or diminished for meeting different conditions.

It will be observed that in each of the embodiments of the invention herein shown and described, means are employed for producing a main field flux for actuating the indicating member B, and means connected with the battery circuit are employed for producing an auxiliary field flux which modifies the main field flux, the auxiliary field flux aiding or opposing the main field flux according to the position of the switch $g$.

I claim as my invention:

1. The combination with a storage battery and its charging or discharging circuit, of a movable indicator, a permanent magnet, a movable actuating coil for said indicator arranged between the pole pieces of the magnet and connected to be responsive to electro-motive-force changes of the battery, and a modifying coil applied to said pole pieces and connected with said battery circuit, substantially as set forth.

2. In a battery indicator, the combination with a movable indicating member, of a permanent magnet, a movable actuating coil for said indicating member arranged between the pole pieces of the magnet, a modifying coil applied to said pole pieces, and a variable shunt arranged across said modifying coil, substantially as set forth.

Witness my hand this 7th day of November, 1903.

RUFUS N. CHAMBERLAIN.

Witnesses:
 CARL F. GEYER,
 EMMA M. GRAHAM.